(12) United States Patent
Fine et al.

(10) Patent No.: US 6,167,668 B1
(45) Date of Patent: Jan. 2, 2001

(54) FINISHED FLOORING UNDERLAYMENT AND METHOD OF MAKING SAME

(75) Inventors: Steve B. Fine, West Haven; Francis X. Quinn, Southbury, both of CT (US)

(73) Assignee: Laticrete International, Inc., Bethany, CT (US)

( * ) Notice: Under 35 U.S.C. 154(b), the term of this patent shall be extended for 0 days.

(21) Appl. No.: 09/227,563

(22) Filed: Jan. 8, 1999

(51) Int. Cl.$^7$ .................................................. E04F 15/022
(52) U.S. Cl. ........................ 52/403.1; 52/409; 52/741.41; 52/742.14; 52/746.1; 52/747.11; 52/749.11
(58) Field of Search ................................. 52/403.1, 409, 52/741.41, 742.14, 746.1, 747.11, 749.11

(56) References Cited

U.S. PATENT DOCUMENTS

| | | |
|---|---|---|
| 4,590,731 | 5/1986 | DeGooyer . |
| 5,942,300 * | 8/1999 | Kukowski, Sr. ................ 52/746.1 X |
| 5,956,921 * | 9/1999 | Fleck et al. .......................... 52/741.3 |

* cited by examiner

Primary Examiner—Christopher T. Kent
(74) Attorney, Agent, or Firm—R. William Reinsmith; Murtha Cullina LLP

(57) ABSTRACT

A finished flooring underlayment is disclosed including a flexible membrane which is resistant to water, mold and deterioration under wet or dry conditions, and which has intertwined filaments bonded to the membrane surface that act as mortar reinforcement and as gauges to provide a uniform thickness of application for cementicious mortar. The mortar is provided separately and is mixed to a suitable consistency with either water or latex additive, then poured or placed on the mat, utilizing the gauges provided by the filaments to effect a uniform thickness of application. This mortar hardens to a strong, load bearing surface or slab suitable for application of finished flooring.

26 Claims, 4 Drawing Sheets

FINISHED FLOORING UNDERLAYMENT AND METHOD OF MAKING SAME

FIELD OF THE INVENTION

This invention relates generally to an underlayment for installation of finished flooring over a substrate or subfloor which is unsuitable for the application of finished flooring and, more particularly, to an underlayment mat for use with such subfloors. The invention further relates to a method of making an underlayment upon which finished flooring is to be installed.

BACKGROUND OF THE INVENTION

Heretofore, the installation of ceramic tiles, marble and thin stone required a sound, clean floor surface which is crack-free, free from excess deflection, and having a smooth surface suitable for application of finished flooring by an adhesive method.

Known methods of preparing these "problem" floor surfaces include the application of a 2 inch Portland cement thin concrete topping, or alternatively, the use of one or two layers of plywood, securely fastened to the floor surface and/or the application of prefabricated cement fiberboard or the application of cement backerboard (which is a composition of Portland cement with light weight aggregate) having two skins of cement rich slurry impregnated with a glass fiber mesh.

The use of these composition boards require cutting, sawing and fitting, which takes considerable time and labor and incurs wastage of sheet goods which normally are supplied in sizes 4'×4', 3'×5' and 4'×8'. The alternative of supplying a 2 inch thick Portland cement composition has the disadvantage of adding some 25–30 pounds per square foot to the floors, and raising the floor elevation a minimum of two inches. In remodeling work, the addition of two inches to a floor may make it unsuitable for existing buildings, and/or the addition of 25 pounds per square foot may exceed the design characteristics or the ability of the existing floor structures to support the finished floor with the normal "dead" load and traffic load that will later be applied.

OBJECTS OF THE INVENTION

A principal object of this invention is to provide a new and improved finished flooring underlayment and a new and improved method of installing such an underlayment that provides strength, reinforcement and crack suppression for the installation of ceramic tile, marble, thin stone, parquet flooring or resilient flooring over subfloors that are not suitable for the direct application of these finished surfaces.

Another object of this invention is to provide a new and improved finished flooring underlayment and a quick and easy installation method which eliminates heretofore costly and labor intensive techniques conventionally used in installing a finished floor over a subfloor unsuited for such an installation.

A further object of this invention is to provide a new and improved finished flooring underlayment and method of installing that underlayment which effectively isolates the underlayment from imperfections of the underlying subfloor so as to eliminate undesired transmittal of shrinkage cracks in the subfloor, for example, to the underlayment and ultimately to the finished flooring.

Other objects will be in part obvious and in part pointed out more in detail hereinafter.

SUMMARY OF THE INVENTION

This invention discloses a composite underlayment mat for use in installing finished flooring over a subfloor unsuitable for direct application of such finished flooring. The mat features a flexible fabric membrane and a flexible mesh. The mesh overlies the membrane and is formed of filaments. The filaments are intertwined in a form-sustaining unitary body for mortar reinforcement and having a generally uniform height preselected to correspond to a desired underlayment thickness.

This invention also discloses a method of making an underlayment for installing finished flooring over a subfloor unsuitable for direct application of finished flooring. Steps of the method include supplying a mat of the type noted in the preceding paragraph, laying the mat over the subfloor, pouring a hydraulic cement composition onto the mat, and measuring the amount of composition being poured by the height of the mesh filaments which serve as gauges to provide a predetermined slab thickness corresponding to the preselected height of the mesh of the mat.

A better understanding of the objects, advantages, features, properties and relations of the invention will be obtained from the following detailed description and accompanying drawings which set forth certain illustrative embodiments and are indicative of the various ways in which the principles of the invention are employed.

DETAILED DISCLOSURE OF THE INVENTION

Substrates or subfloors which have normally presented problems in the application of finished flooring have included such surfaces as strip wood flooring, single layer plywood flooring, concrete floors with shrinkage, cracks or contamination and other unsound floors in residences, commercial buildings and structures under remodeling.

Figure 1:
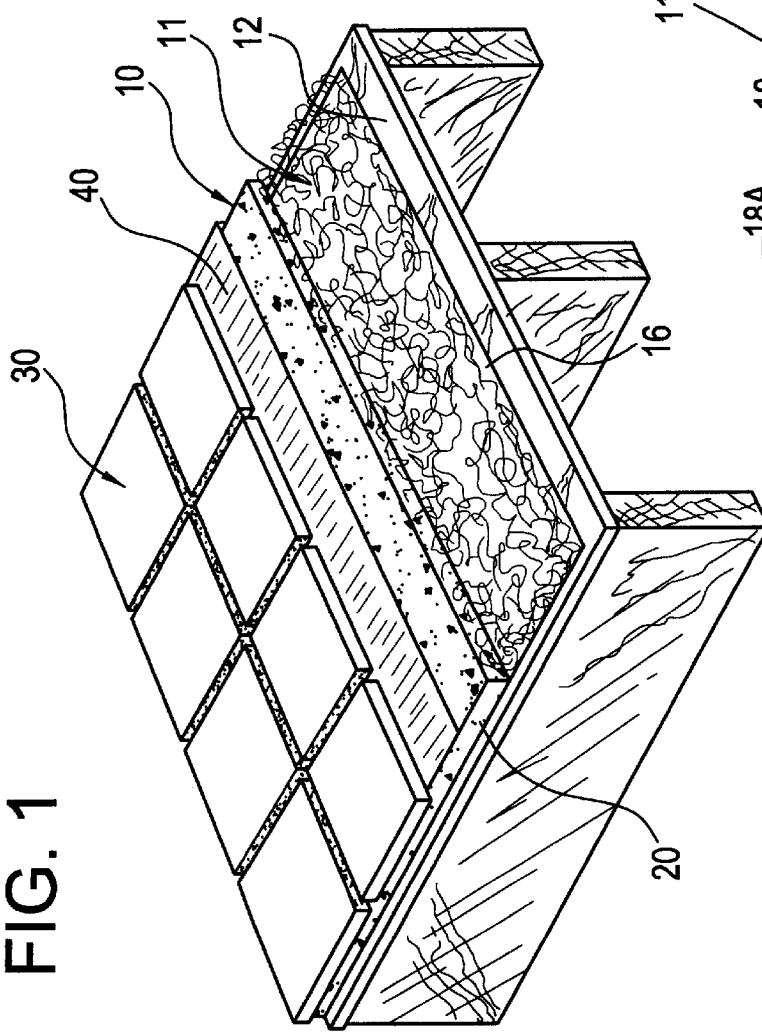
FIG. 1 is a perspective view, partly broken away and partly in section, illustrating an underlayment of this invention installed over a wood subfloor and finished flooring being applied to the underpayment.
Figure 2:
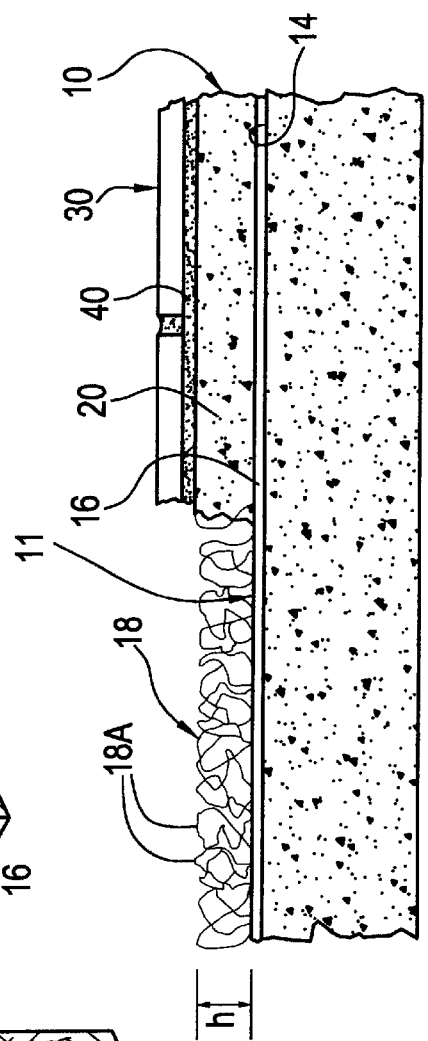
FIG. 2 is a side view, partly in section and partly broken away, of an installation similar to that shown in FIG. 1 installed over a concrete subfloor.
Figure 3:
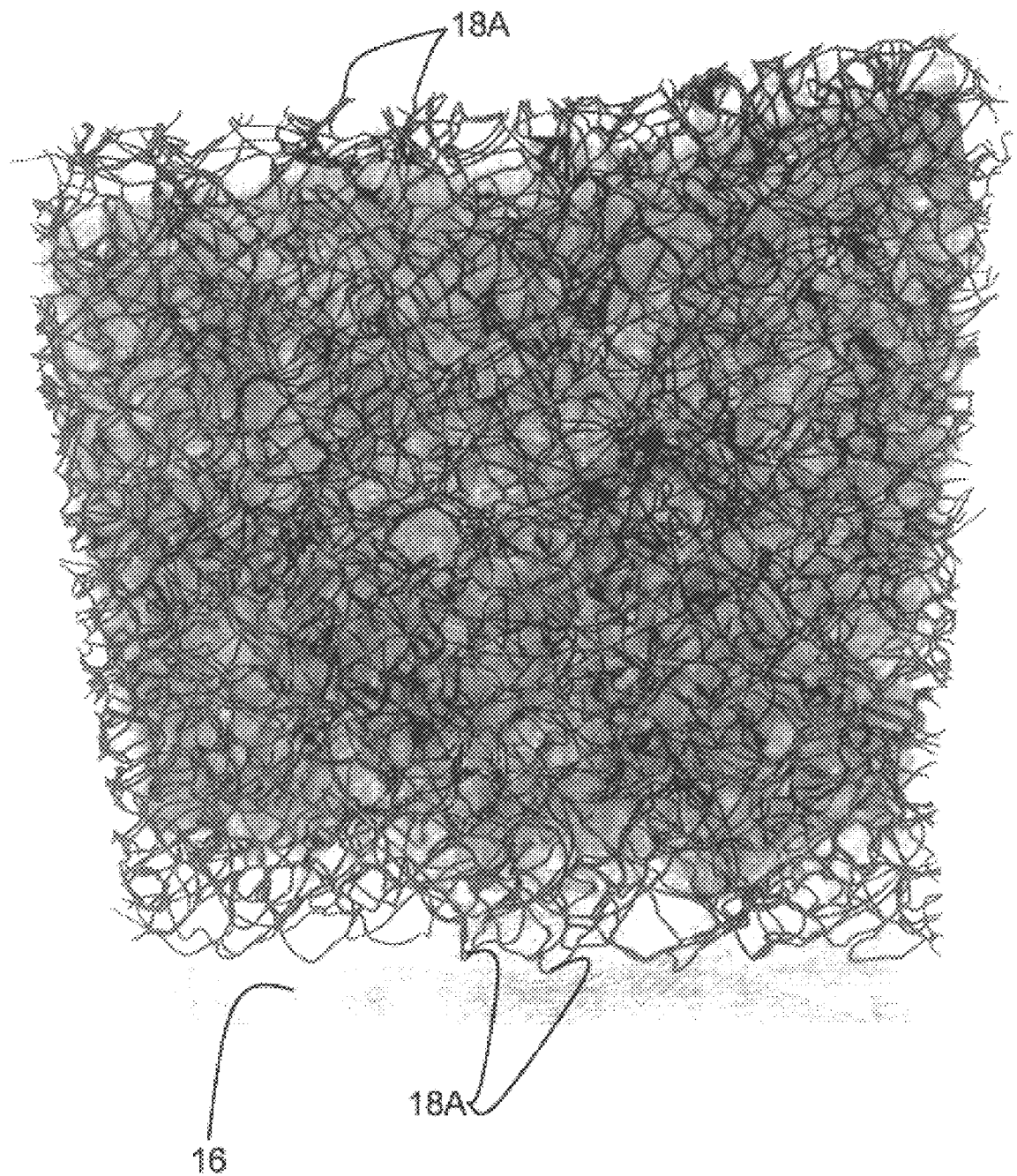
FIG. 3 is a photographic top plan view of an underlayment mat of this invention.

An underlayment is disclosed in FIGS. 1 and 2 used to prepare such problem surfaces such as at 12 (FIG. 1) and at 14 (FIG. 2) which are normally unsuitable for the application of finished flooring. In addition to being versatile for fixing irregular and problem subfloors, it is desired to provide a strong, sound surface as thin as 0.4 inch, for example, with a possibility of increasing that surface to 0.7 inch or more with additional strengthening and rigidity if so required. A relatively thin underlayment slab then may be achieved which is approximately ¼ the thickness of conventional mortar beds.

To achieve these objectives in a relatively inexpensive product which is particularly facile to install in a quick and easy fashion, the underlayment 10 of this invention features a mat 11 having a flexible membrane 16 and a flexible reinforcing mesh 18 overlying the membrane 16, the mesh 18 being formed of an entanglement of filaments 18A intertwined at random for reinforcement of a hydraulic cement based composition or cementicious mortar 20 and having a generally uniform height "h" (FIG. 2) preselected to correspond to a desired underlayment thickness.

More specifically, the membrane 16 may be of any suitable construction formed of waterproofed paper, non-woven fabric, cloth or plastic. A preferred composition of a plastic membrane or non-woven fabric may be formed of various resin combinations not limited to polyester, polyethylene (PE), polypropylene (PP), linear high density polypropylene, (LHDP), linear low density polypropylene (LLDP), vinyl resins, nylon resins, or other moldable and/or extrudable resins which have properties including resistance to mold, fungus, deterioration or disintegration when exposed to alkaline and moist conditions.

To provide mortar reinforcement and to additionally effect accurate gauging of a cementicious mortar 20 when that mortar is poured onto the mat in forming an underlayment slab, the mesh is shown overlying the membrane. The mesh filaments 18A are irregularly spaced and may be formed of plastic, fiberglass or other suitable material intertwined in a form-sustaining unitary body for mortar reinforcement and providing the mesh 18 with a uniform height "h" preselected as noted above to correspond to a desired underlayment thickness. Thus, a load bearing slab of generally uniform thickness is readily formed as predetermined by the height of the mesh. While the mesh 18 may be simply laid over the membrane 16 in a free state during installation, it has been found convenient to bond discrete portions of the mesh 18 to the upper surface of the membrane 16 such that the membrane and overlying mesh form a flexible unit which facilitates the cutting of the mat 11 to match the subfloor 12 (or 14) and resists undesired displacement of the mesh relative to the membrane during the pouring and leveling of the mortar 20. A preferred embodiment of this invention includes mesh filaments 18A made of nylon resins. A mesh and membrane which has been found to perform satisfactorily is sold by Akzo Nobel under the trademark "Enkadrain" for use as a drainage product.

The mesh featuring the mortar reinforcing and self-gauging filaments 18A may be thermally, adhesively, or sonically bonded to the membrane 16 which may be produced in rolls or flat sheets, and in widths of 24 inches, 36 inches or other widths suitable for specific applications. In a preferred embodiment of this invention, the density of nylon mesh filaments 18A on the membrane 16 ranges from about 6 ounces per square yard to about 18 ounces per square yard.

Accordingly, an underlayment mat 11 of this invention provides a simple, clean, easy to install pre-fabricated package furnished in rolls that are lightweight, convenient to handle, easy to cut and fit with minimum waste. The rolls are simple to unroll. They then provide a surface which supports a semiplastic application of a hydraulic cement based composition or cementicious mortar 20. The latter may be furnished in a factory prepared kit requiring only the addition of water or a latex to make a semi-self leveling and pourable composition which is then spread over the preformed membrane 16 with its mesh 18 of gauging projections provided by the intertwined entanglement of filaments 18A. The semiplastic hydraulic composition or mortar 20 may then be struck off or made level with a straight edge or trowel, after placement, using the filament mesh 18 overlying the membrane 16 to ensure a uniform thickness of a strong mortar flooring, suitable for direct application of ceramic tile, for example, by an adhesive method. Thickness may be varied to level uneven surfaces.

The flexible membrane 16 is designed to be free floating and to prevent the bonding of the mortar 20 to the subfloor 12 (or 14). In this way the membrane 16 essentially separates and isolates the underlayment 10 from the floor below for minimizing transmittal of shrinkage cracks in the underlying floor or cracks caused by movement of plywood, strip flooring or concrete, e.g., through the underlayment 10 and further transmitted through the underlayment to the finished flooring which is sensitive to such crack transmission. The disclosed underlayment 10 accordingly isolates the cracks and movement of the subfloor from the underlayment and thereby eliminates the transfer of such cracks or movement through and to the finished surface. Therefore, the resulting finished floor features a crack suppression membrane.

For convenience and to optimize installation of the finished flooring underlayment 10, a premixed hydraulic composition or mortar powder 22 (FIG. 7) may be supplied with the mat package, the composition powder being delivered in sealed multi-layered paper bags, plastic bags or pails and/or fiber drums.

Figure 8:
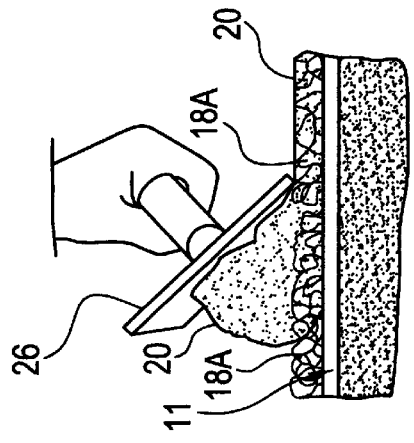
Figure 9:
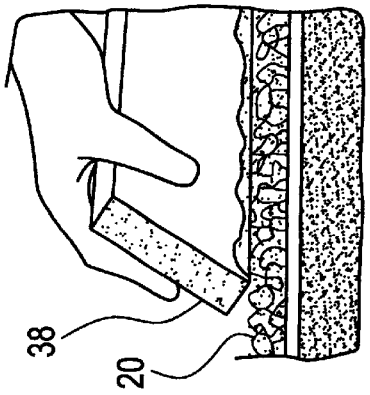

This hydraulic powder 22 is then mixed with water 24 or the prescribed latex to a plastic high slump consistency and poured onto the installed mat 11 which has been previously placed on the subfloor. The material is then spread or struck off with a straight edge 38 (FIG. 9) or trowel 26 (FIG. 8) to fill all the voids in the mesh 18 and brought down to the level of its gauging filaments 18A.

The plastic hydraulic composition 20 poured into the prepared mat 11 is then allowed to cure or harden and in about 24 to 36 hours is ready for walk-on traffic and the application of finished flooring.

A rapid hardening version of the hydraulic composition can also be supplied when quick preparation or resurfacing of floors is needed or desired.

The rapid hardening version may consist of the dry powder composition with accelerators incorporated, or may use the standard dry hydraulic composition powder with the addition of a latex additive that contains accelerators to provide a rapid hardening floor underlayment.

The hydraulic compositions to be used for filling the preformed mats may consist of one or more of the following compositions:

FORMULA I: Mixtures of Portland cement, with graded sand and fine aggregates, which may include fiberglass or resin-coated fiberglass reinforcing fibers, or polypropylene, aramid and/or nylon, or other fibers used in cement and plastic compositions, mixed with water or latex to form the hydraulic composition.

FORMULA II: The above Formula I, including water soluble or polymer additives providing about 1% to about 10% of the total weight of the components, which disperse or dissolve with the addition of water, and provide water retaining and improved performance characteristics to the hydraulic compositions.

FORMULA III: A composition similar to Formula I which may include hydraulic cement such as calcium aluminate cements or blends of calcium aluminate and Portland cements.

FORMULA IV: A similar composition to Formula I which may include Portland cement modified with the addition of rapid hardening hydraulic cement such as calcium aluminate cement or other additives incorporated to provide rapid hardening of the finished hydraulic composition.

FORMULA V: A similar composition to Formula I listed above, which is used solely with water to provide semi-plastic, semi-self leveling mortars used to fill the underlayment base.

FORMULA VI: A composition similar to Formula I above, which may include latex emulsions containing styrene butadiene, or ethylene vinyl acetate with a solids content of about 10% to about 30% of the total weight of the components.

FORMULA VII: A composition similar to Formula I above, used with acrylic emulsions which may include various acrylic polymers such as methyl acrylate or combinations of methyl, ethyl, and butyl acrylates.

FORMULA VIII: A composition similar to Formula I listed above, but which may be designed for the addition of vinyl emulsions or terpolymer emulsions with a solids content of about 10% to about 30% of the total weight of the components.

Figure 4:
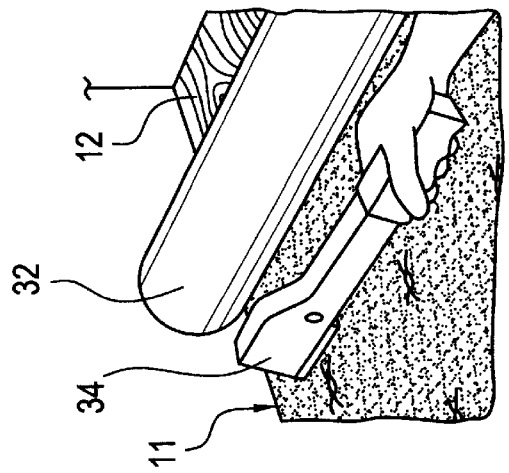
FIGS. 4–10 are schematic views of different steps included in installations of the type shown in FIG. 1 and FIG. 2.
Figure 5:
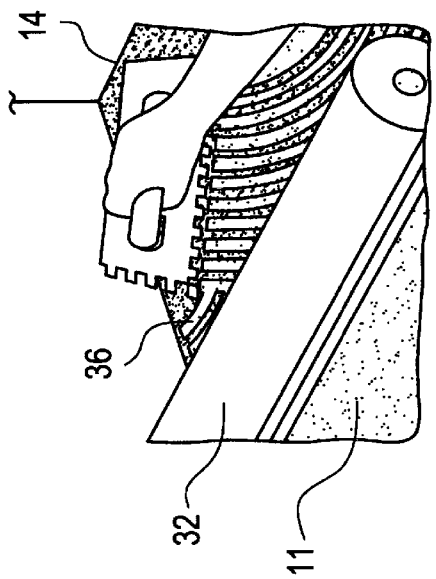
Figure 6:
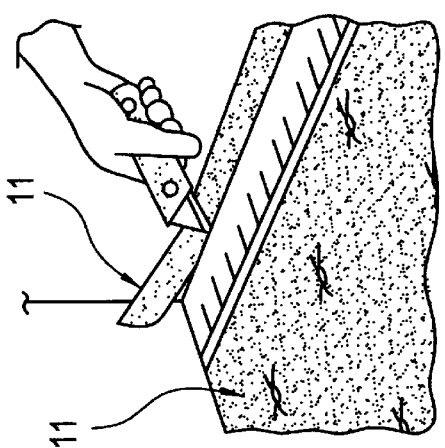
Figure 7:
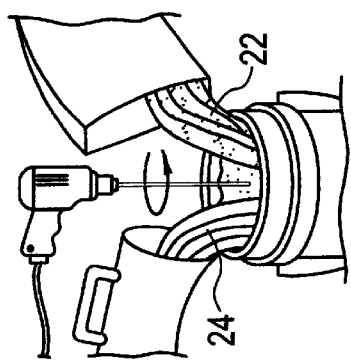
Figure 10:
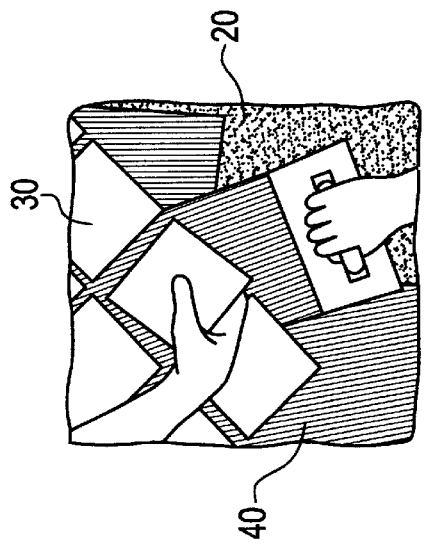

In accordance with the method of this invention of making a finished flooring underlayment 10 for use in installing finished flooring such as at 30 on a subfloor 12 or 14, the mat 11 of this invention is supplied as described above as either flat precut elements or as rolls 32 to be unrolled and laid on the subfloor 12 and 14 as schematically illustrated in FIG. 4 and FIG. 5, respectively. Adjacent rolls, not shown, will be understood to have adjacent portions of the membrane lapping one another in longitudinally extending side-by-side strips in sealing relation to one another to ensure a barrier isolating the mortar 20 from the underlying subfloor. If desired, the mat 11 may be fastened with staples by staple gun 34 on wood subfloor 12 as shown in FIG. 4 or secured with adhesive 36 for bonding the membrane of roll 32 to a concrete subfloor 14 as shown in FIG. 5. In either case, the attachment of mat 11 to the underlying subfloor is designed to be self-releasing under stress to ensure the integrity of the underlayment 10 and maintenance of its membrane as a crack suppression member. FIG. 6 depicts the mat 11 being cut to fit the underlying subfloor. In FIG. 7 the hydraulic cement based composition powder 22 is schematically illustrated as being mixed with water or latex 24 in preparation to being applied to the mesh 18 such as in FIG. 8 where mortar 20 is illustrated as being packed into the mesh with a trowel 26 and thereafter leveled (FIG. 9) with a straight edge 38 to match the height of the mesh 18 of the mat 11, it being understood that the amount of the mortar 20 being poured onto the mat 11 is measured by the height of the mesh filaments 18A. Additional mortar 20 may be applied to achieve a smooth, level underlayment. Thereafter, the mortar 20 is permitted to cure, and finished flooring 30 is then installed directly onto adhesive 40 applied to the underlayment after the mortar 20 has cured. FIG. 10 exemplifies schematically the application of finishing tile 30 being installed by an adhesive method onto the cured underlayment.

In the following examples, finished flooring underlayments were prepared in accordance with the present invention. These examples are given to illustrate the invention, but should not be deemed to limit it.

EXAMPLE 1

A floor was assembled according to the following method. A layer of ⅝ inch thick plywood was assembled on 16 inch on-center joists. The joists were 1.5 inches wide by 2.25 inches high. The plywood sheets were nailed to the joist system 6 inches on-center along the edges and 8 inches on-center in the field of the panel. 8d ring shank nails were used.

A 0.7 inch thick plastic mat having bonded plastic filaments was stapled to the plywood. A mortar of Formula II type was mixed with water to a high slump consistency. The mortar was placed by spreading it into the mat with a flat trowel and then leveling it off to smooth it with a straight edge.

The underlayment was allowed to cure 28 days.

12 inch×12 inch×¼ inch marble was adhered to the cured underlayment with a latex fortified cementicious adhesive.

The marble was grouted with a latex fortified cementicious unsanded grout.

A Robinson Floor Test was run on the completed installation according to ASTM C-627. There was grout cracking at cycle 13 (out of 14 total cycles). The largest deflection (while 300 pounds was on each wheel) was 10 mils/0.25 mm. The Tile Council of America gives this performance a Heavy Rating.

EXAMPLE 2

A 2 inch thick concrete slab was made with commercially available concrete mix. The slab was allowed to cure 3 days. Then a 0.4 inch thick plastic mat having bonded nylon filaments was adhered to the concrete using a mastic type tile adhesive. A seam was placed in the middle of the slab. A latex fortified mortar similar to Formula II was mixed to a high slump consistency. The mortar was placed by spreading it into the mat with a flat trowel and leveling it. The underlayment was allowed to cure overnight. 12 inch×12 inch×⅜ inch porcelain tile was adhered to the underlayment using a latex fortified thinset adhesive. The tile adhesive was allowed to cure overnight. The tile was then grouted with a latex fortified sanded grout.

The underlayment mortar was allowed to cure 28 days. The adhesive mortar cured 27 days and the grout cured 26 days.

A Robinson Floor Test was run on the system according to ASTM C-627. The test went 14 cycles with no failure. The Tile Council of America gives this performance an Extra Heavy Rating.

EXAMPLE 3

A floor was assembled according to the following method. A layer of ¾ inch thick tongue and groove oriented strand board was assembled on 24 inch on center joists. A tongue and groove seam was placed at 1 foot in on the test machine such that the seam was in the wheel path. The joists were 1.5 inches wide by 2.25 inches high. The sheet were nailed to the stud system 6 inches on center along the edges and 8 inches on center in the field of the panel. 8d ring shank nails were used.

A 0.7 inch thick plastic mat having bonded plastic filaments was stapled to the plywood. A mortar of Formula II type was mixed with water to a high slump consistency. The mortar was placed by spreading it into the mat with a flat trowel and then leveling it with a straight edge. The tile was 12 inch×12 inch ⅜ inch porcelain tile and was adhered to the underlayment using a latex fortified thinset adhesive. The tile adhesive was allowed to cure overnight. The tile was then grouted with a latex fortified sanded grout.

The underlayment mortar was allowed to cure 36 days. The adhesive mortar cured 28 days and the grout cured 27 days.

The deflection was 60 mils (1.5 mm) before the underlayment was placed and 5 mils (0.125 mm) after the underlayment and tile was installed.

A Robinson Floor Test was run on the system according to ASTM C-627. The test went 14 cycles with no failure. The Tile Council of America gives this performance an Extra Heavy Rating.

It will be appreciated by those skilled in the art that the present invention provides a thin, lightweight mortar bed system with a high strength base for ceramic tile, marble and stone over problem subfloors such as hardwood, strip floors, single layer plywood, luan and chipboard and cracked or contaminated concrete. By virtue of the unique mat featuring the flexible membrane and mesh for mortar reinforcement and gauging of the mortar applied, a particularly quick and easy installation is achieved for reliable performance for extended periods of time under demanding conditions.

Although this invention has been illustrated and described with respect to exemplary embodiments thereof, it should be understood by those skilled in the art that various changes, omissions and additions may be made without departing from the spirit and scope of the invention.

What is claimed is:

1. A composite finished flooring underlayment mat for use in installing finished flooring over a subfloor unsuitable for direct application of finished flooring, the composite mat comprising a flexible membrane, a flexible mesh overlying the membrane, the mesh being an entanglement of irregularly spaced filaments intertwined in a form-sustaining unitary body providing mortar reinforcement and a generally uniform height preselected to correspond to a desired underlayment thickness, and a mortar filling interstices of the mesh and forming a load bearing slab having a generally uniform thickness predetermined by the height of the mesh.

2. The mat of claim 1 further including a hydraulic cement based composition, the mesh filaments serving as gauges for measuring the hydraulic cement based composition when poured onto the mat to form a load bearing slab of generally uniform thickness predetermined by the height of the mesh.

3. The mat of claim 1 wherein the mortar is a mixture of Portland cement including graded sand and fine aggregates.

4. The mat of claim 3 wherein the mortar further includes reinforcing fibers.

5. The mat of claim 1 wherein the mortar includes a rapid hardening hydraulic cement additive.

6. The mat of claim 1 wherein the mortar is used solely with water to form a semi-plastic, semi-leveling mixture for filling the interstices of the mesh.

7. The mat of claim 1 wherein the mortar further includes an emulsion selected from the group consisting of latex emulsions, acrylic emulsions, vinyl emulsions and terpolymer emulsions.

8. The mat of claim 1 wherein the mortar further includes an additive selected from the group consisting of water soluble additives and polymer additives, the additive comprising from about 1% to about 10% of the total weight of the mortar.

9. The mat of claim 1 wherein the membrane is a material resistant to water, mold, fungus, deterioration and disintegration when exposed to alkaline and moist conditions.

10. The mat of claim 1 wherein the mesh filaments are made of nylon resins.

11. The mat of claim 1 wherein the mesh filaments are made of polyester.

12. The mat of claim 1 wherein the mesh filaments are made of aramid.

13. The mat of claim 1 wherein the density of the mesh filaments on the membrane ranges from about 6 ounces per square yard to about 18 ounces per square yard.

14. The mat of claim 1 wherein the membrane is a plastic resinous material, wherein the mesh filaments are made of nylon resins, and wherein discrete portions of the mesh filaments are heat molded to the membrane.

15. The mat of claim 1 wherein the mesh filaments include discrete portions bonded to the membrane, the membrane and overlying mesh jointly constituting a flexible member capable of being supplied in roll form and being installed simultaneously as a unit.

16. A method of making a finished flooring underlayment for use in installing finished flooring over a subfloor unsuitable for direct application of finished flooring, the method comprising the steps of supplying a finished flooring underlayment mat including a flexible membrane and an overlying flexible mesh formed of an entanglement of intertwined irregularly spaced filaments in a form-sustaining unitary body having a generally uniform preselected height, laying the membrane over the subfloor with the mesh overlying the membrane, pouring a hydraulic cement based composition onto the mat with the membrane isolating the composition from the underlying subfloor to form a slab for supporting finished flooring, and measuring the amount of the composition being poured onto the mat by the height of the mesh filaments which serve as mortar reinforcement and as gauges to provide a predetermined slab thickness corresponding to the preselected height of the mesh of the mat.

17. The method of claim 16 including after the pouring step the further steps of packing the composition into the underlayment mat, leveling the hydraulic cement based composition with a trowel, and then curing the composition.

18. The method of claim 16 wherein the supplying step includes supplying the underlayment mat in roll form with discrete portions of the mesh bonded to an upper surface of the membrane, and wherein the laying step includes unrolling the membrane and the mesh in unison over the subfloor with the membrane in direct surface-to-surface engagement with the subfloor.

19. The method of claim 18 wherein the laying step includes unrolling the mat over the subfloor in side-by-side strips, and lapping adjacent membrane portions of the mat strips to ensure a barrier isolating the composition from the underlying subfloor.

20. The method of claim 16 including the further steps of packing the composition into the mesh of the mat, and then leveling the composition with a straight edge to match the height of the mesh of the mat.

21. The method of claim 20 wherein the leveling step includes correcting uneven surfaces by adding and leveling supplemental composition.

22. The method of claim 16 wherein the laying step includes stapling the membrane of the mat to a subfloor formed of wood to facilitate the pouring step, the stapling step effecting an attachment of the membrane to the subfloor releasable under stress to maintain usefulness of the membrane as a crack suppression member.

23. The method of claim 16 wherein the laying step includes fixing the membrane of the mat by adhesive to a subfloor formed of concrete to facilitate the pouring step, the fixing step effecting an attachment of the membrane to the subfloor releasable under stress to maintain usefulness of the membrane as a crack suppression member.

24. The method of claim 16 further including the step of cutting the mat to fit the underlying subfloor before the pouring step.

25. The method of claim 16 including the further steps of cutting the mat to match the subfloor, and lapping all seams between adjacent membrane portions of the mat to ensure integrity of the mat and isolation of the composition to prevent its bonding to the underlying subfloor.

26. The method of claim 16 further including the steps of curing the composition, and installing finished flooring onto the underlayment after the composition is cured.

* * * * *